United States Patent [19]

Austin

[11] Patent Number: 5,472,069
[45] Date of Patent: Dec. 5, 1995

[54] VIBRATION DAMPING DEVICE

[75] Inventor: Stephen A. Austin, Amston, Conn.

[73] Assignee: The United States of America as represented by the Secretary of the Navy, Washington, D.C.

[21] Appl. No.: 152,636

[22] Filed: Oct. 27, 1993

[51] Int. Cl.$^6$ ............................................ F16F 9/53
[52] U.S. Cl. ................................. 188/267; 267/140.14
[58] Field of Search .............................. 188/267, 298; 267/140.14, 140.15

[56] References Cited

U.S. PATENT DOCUMENTS

| | | | |
|---|---|---|---|
| 4,773,632 | 9/1988 | Härtel | 188/267 X |
| 4,869,476 | 9/1989 | Shtarkman | 267/140.14 |
| 4,893,800 | 1/1990 | Tabata | 188/267 X |
| 5,248,113 | 9/1993 | Daniels | 188/267 X |
| 5,277,281 | 1/1994 | Carlson et al. | 188/267 |

FOREIGN PATENT DOCUMENTS 4258543  9/1992  Japan ................................. 188/267

*Primary Examiner*—Robert J. Oberleitner
*Assistant Examiner*—Alfred Muratori
*Attorney, Agent, or Firm*—Michael J. McGowan; Prithvi C. Lall; Michael F. Oglo

[57] ABSTRACT

There is provided a vibration damping device comprising a flexible body forming an enclosed chamber, a plurality of electrically conductive members located within the chamber and spaced from each other along a common axis, the common axis being parallel to an inside surface of the flexible body. A fluid fills the chamber and is in contact with the flexible body inside surface and exposed surfaces of the conductive members, the fluid being resistant to shear stress when activated by an electric potential. The conductive members are arranged in the flexible body so as to provide an open region bounded at least in part by the conductive members and extending through the flexible body. Wires connected to an electrical power source are provided for electrically energizing the conductive members to create an electric field between each pair of neighboring conductive members and to create an electric field in the open region, thereby activating the fluid in the open region and between each pair of conductive members.

5 Claims, 6 Drawing Sheets

VIBRATION DAMPING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to vibration damping devices and is directed more particularly to a flexible electrorheological (ER) vibration damping device.

2. Description of the Prior Art

A predominant method for the dissipation of vibrational energy is through the interaction between a plunger mechanism and a fluid in an enclosed chamber. The proficiency of such dampers is dependent, at least in part, on the viscosity of the fluid, the pressure under which the fluid is maintained, and the like. Once selected, the viscosity is fixed unless and until the fluid is removed and replaced by a fluid having a different viscosity. Such dampers typically are provided with moving parts which include, in addition to a moving piston, mechanical linkages, valves, and orifices. If the fluid chamber forms part of a hydraulic system, all the appurtenances of a hydraulic system are required, including pumps, regulators, and the like.

The discovery of electrorheological (ER) fluids in 1940, made available fluids adapted to transform from a Newtonian fluid to a solid substance, capable of resisting an applied stress, when the fluid is activated by an electrical potential. When the electric potential is removed, the solid substance reverts to the original Newtonian fluid. ER fluids are two-phase systems containing micron sized particles suspended in a carrier fluid. When the ER fluid is subjected to an electric field, the particles polarize and develop a network of three dimensional chains. The ER fluids develop an electric field dependent yield stress, when activated by an electric field. In the activated state, the ER fluids resist an applied shear stress, providing the applied load does not exceed the developed yield stress. In the absence of an electric field, an ER fluid exhibits Newtonian behavior. The activation time from the Newtonian state to the stress resistant state is typically on the order of a few milliseconds. The many applications of such fluids includes use in clutches, viscous dampers, valves and active engine mounts.

There have been developed systems for the dissipation of vibrational energy through the interaction between a plunger mechanism and the ER fluid. The ER fluid properties are actively altered by the magnitude of an electric field applied; thus, the response of the structure is readily altered and controlled. One such device, shown in FIG. 1, utilizes vanes 10 affixed to the damper's plunger 12. The attached vanes 10 are spaced from the surface of copper plates 14 lining the inside surface of a damper casing 16. When copper plates 14 are energized, the volume of ER fluid between vanes 10 and copper plates 14 is activated, or electrically stressed, thereby placing that portion of the ER fluid in a stress-resistant state. As plunger 12 moves up and down inside casing 16, the ER fluid along with the copper plates 14 is successively and repeatedly activated and deactivated by the motion of the vanes 10.

In another such device, shown in FIG. 2, an orifice 20 between upper and lower fluid chambers (22, 24) includes an electrode structure. Plates 26 of the electrode structure are parallel to the direction of fluid flow through orifice 20. The activation and deactivation of the ER fluid controls the amount of fluid which can flow through orifice 20.

SUMMARY OF THE INVENTION

An object of the invention is to provide a vibration damping device utilizing electrorheological fluids to dissipate vibrational energy, which device is tunable electrically such that the damping characteristic of the device can be tailored to a given application.

A further object of the invention is to provide a vibration damping device in which the damping characteristics are not dependent upon a fixed fluid viscosity.

A still further object of the invention is to provide a vibration damping device in which there are no orifices, mechanical linkages, pistons, valves, or other moving parts.

With the above and other objects in view, as will hereinafter appear, a feature of the present invention is the provision of a vibration damping device comprising a flexible body forming an enclosed chamber, a plurality of electrically conductive members located within the chamber and spaced from each other along a common axis, the common axis being parallel to an inside surface of the flexible body. A fluid fills the chamber and is in contact with the flexible body inside surface and exposed surfaces of the conductive members, the fluid being resistant to shear stress when activated by an electric potential. The electrically conductive members are arranged in the flexible body so as to provide an open region bounded at least in part by the conductive members and extending through the flexible body. Means are provided for electrically energizing the conductive members to create an electric field between each pair of neighboring conductive members and to create an electric field in the open region, thereby activating the fluid in the open region and between each pair of the conductive members.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
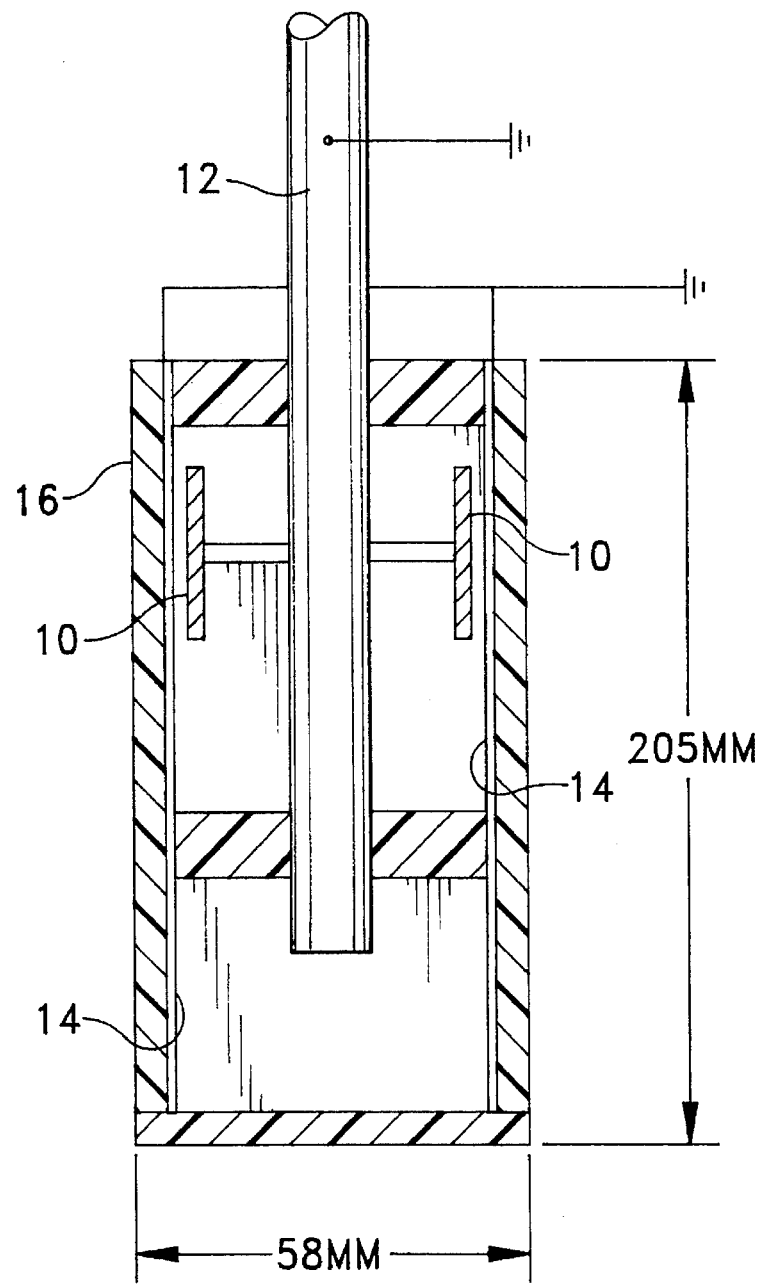
FIG. 1 is a diagrammatical, partly sectional, view of a prior art vibration damping device.
Figure 2:
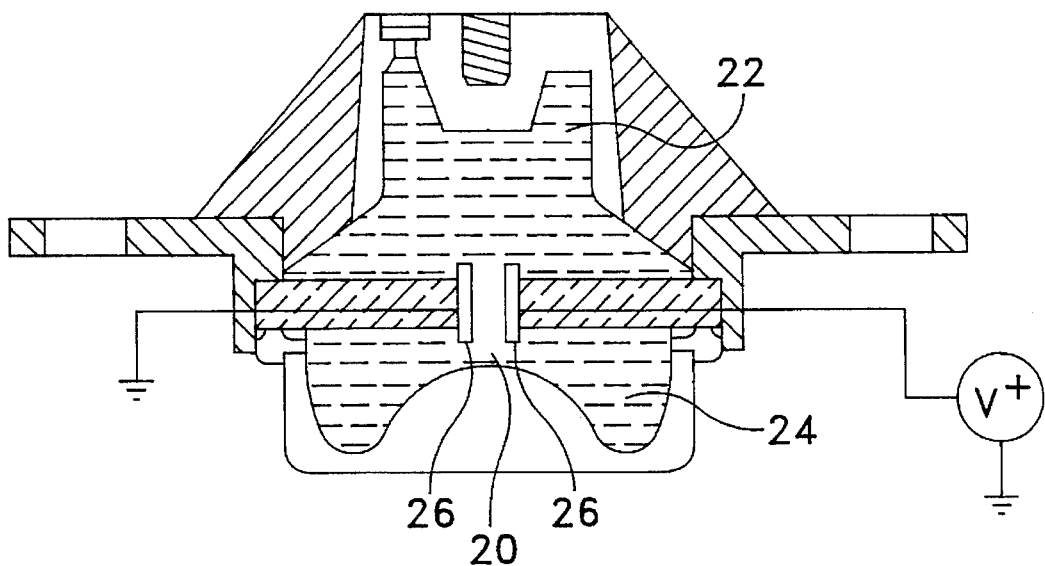
FIG. 2 is a diagrammatical sectional view of another prior art vibration damping device.
Figure 3:
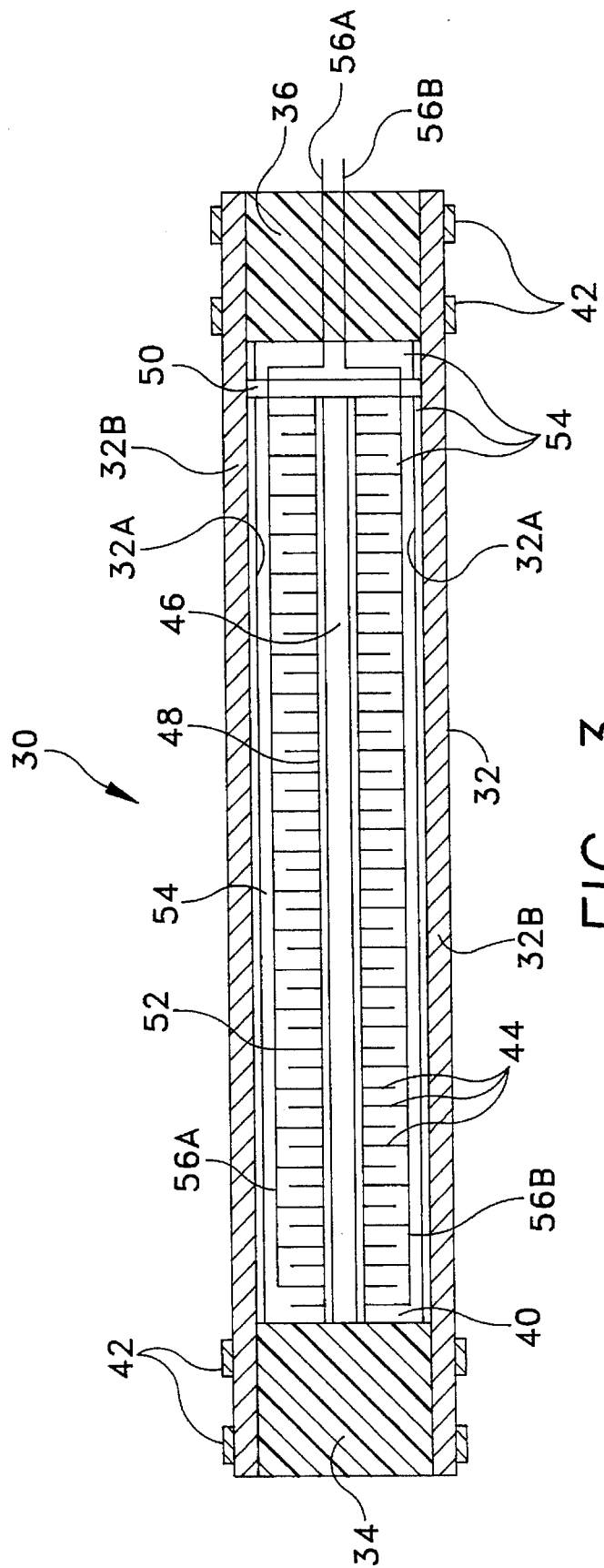
FIG. 3 is a sectional view of one form of vibration damping device illustrative of an embodiment of subject the invention.

Referring to FIG. 3, it will be seen that an illustrative embodiment of the invention comprises a vibration damper 30 including a body 32 of flexible material, such as polyester rubber, having an inside surface 32A and a wall 32B. Rigid end caps 34, 36 seal the ends of the flexible body 32 to form a leak tight chamber 40. The end caps 34, 36 may be secured in place by clamps 42. While the flexible body 32 is illustrated as a cylinder, it may be of any size and be of any shape, such as a rectangular hollow tube, which creates a fringe field, as discussed herein below, and damps vibratory motion.

Positioned within chamber 40 are a plurality of electrode disks 44 mounted on and spaced along a centering rod 46. Electrode disks 44 are spaced from each other and are disposed on bushings 48 encircling the centering rod 46. Centering rod 46 and bushings 48 are of nonconductive material, such as nylon. The electrode disks 44 may be of copper, or of any electrically conductive material and construction, such as solid foil or wire mesh, which is adapted to accommodate the voltages required and the expected loads from the vibratory motion. One end of centering rod 46 is connected to end cap 34. The other end of the centering rod 46 is connected to a block 50 spaced from end cap 36 and having a shape and size which will center the other end of centering rod 46 in flexible body 32. Block 50 is spaced from end cap 36 a distance greater than the expected axial deflection of the motion compressing damper 30.

Electrode disks 44 are sized such that an annular open fringe region 52 is established between disks 44 and inside surface 32A of the flexible body. Chamber 40 is completely filled with an ER fluid 54. The ER fluid may be corn starch and mineral oil or other suitable fluids. ER fluid 54 fills the spaces between electrode disks 44 and the fringe region 52 so that the ER fluid is in intimate contact with inside surface 32A of the flexible body and the exposed surfaces of electrode disks 44.

Electrode disks 44 are electrically and alternatively interconnected to wires 56A, 56B, such that one disk of an opposing pair of disks is connected to wire 56A and the other disk of the pair is connected to wire 56B. The wires 56A, 56B pass through end cap 36 and are switchably connected to an electrical power source (not shown), which may be a variable voltage source.

Figure 4:
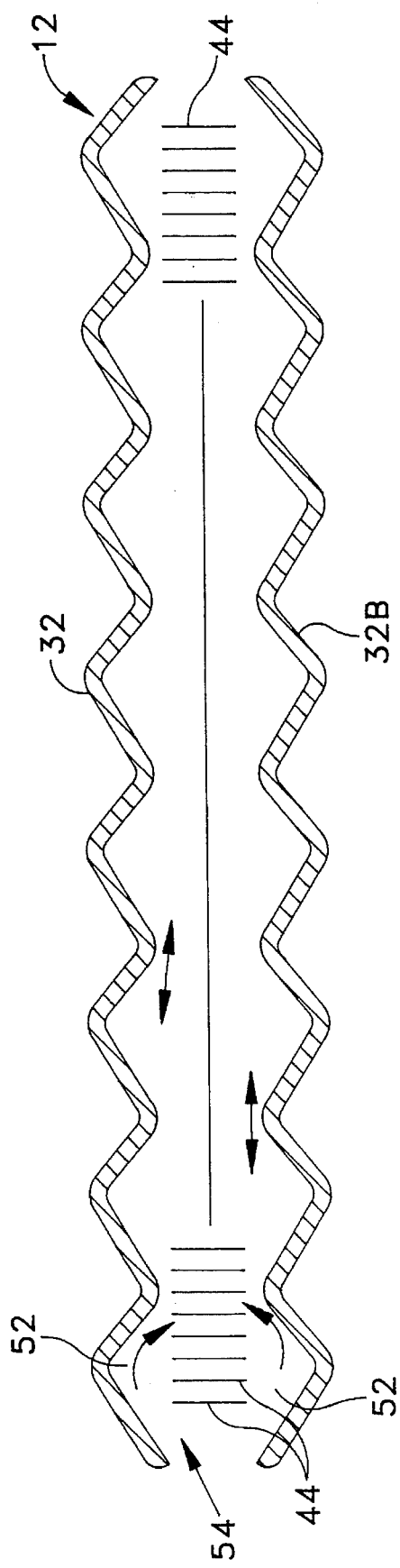
FIG. 4 is a diagrammatical illustration of the damping device of FIG. 3 undergoing vibrational activity.

Referring to FIG. 4, it will be seen that when a vibratory force is imposed on an end cap 34, 36 of the damper 30 of the present invention, wall 32B flexes. As illustrated in FIG. 4, if the electrode disks 44 are not energized, ER fluid 54 flows in the fringe region 52 and between disks 44. While the viscosity of ER fluid 54 and the flow paths damp the motion of the flexible cylinder 12, it is not as effective as when the electrode disks are energized by the electrical power source.

Figure 5:
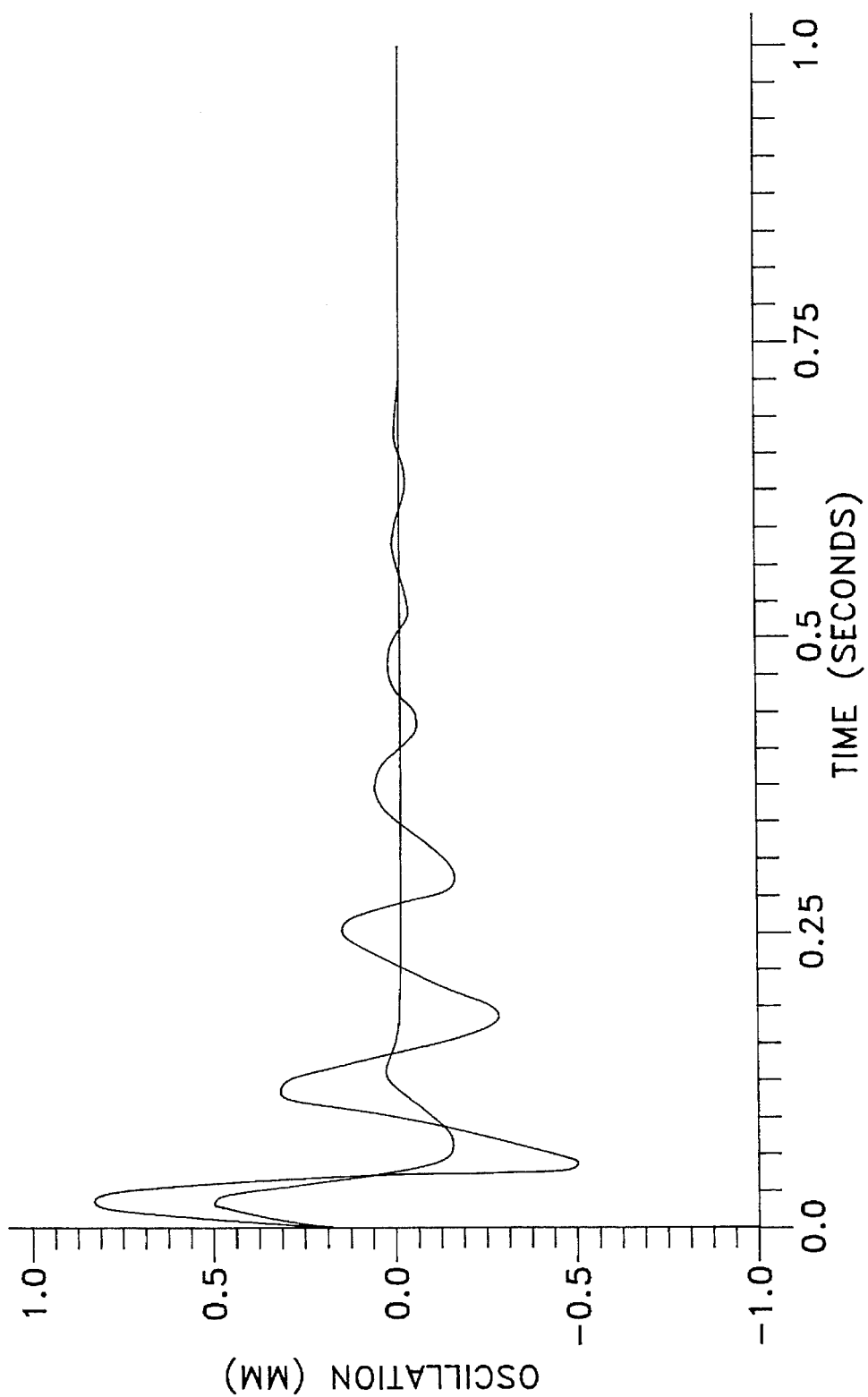
FIG. 5 is a comparative chart.

A comparison of the damping effect for a de-energized and energized damper 30 of the present invention is provided in FIG. 5. As shown by curve 60, a de-energized damper will dissipate the force in about 0.60 seconds. An energized damper, curve 62, on the other hand, damps the same force in about 0.25 seconds.

Figure 7:
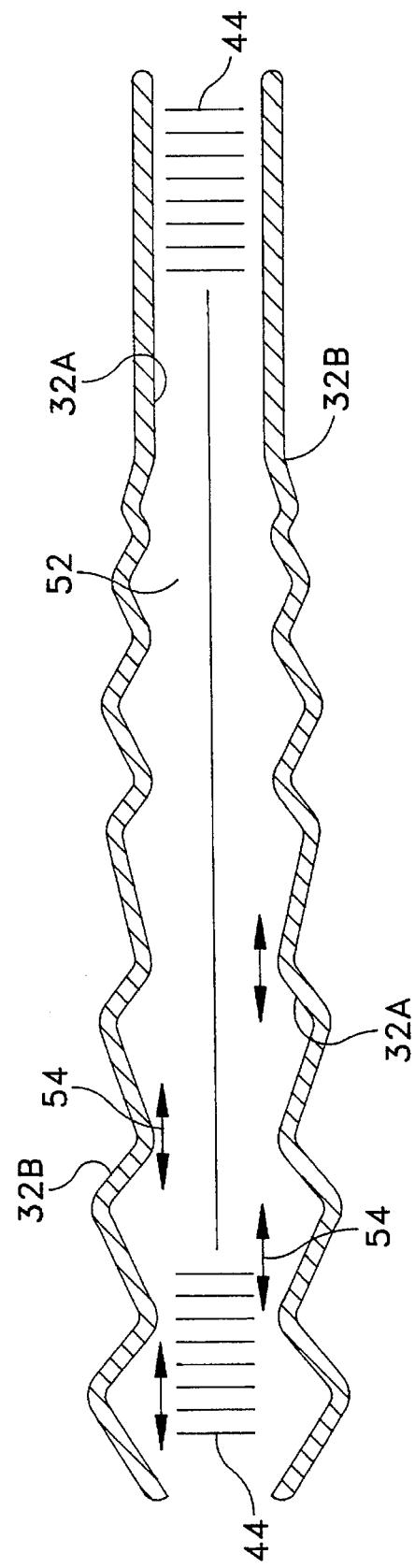
FIG. 7 is similar to FIG. 4, but illustrates diagrammatically the damping device with electric potential applied thereto.
Figure 6:
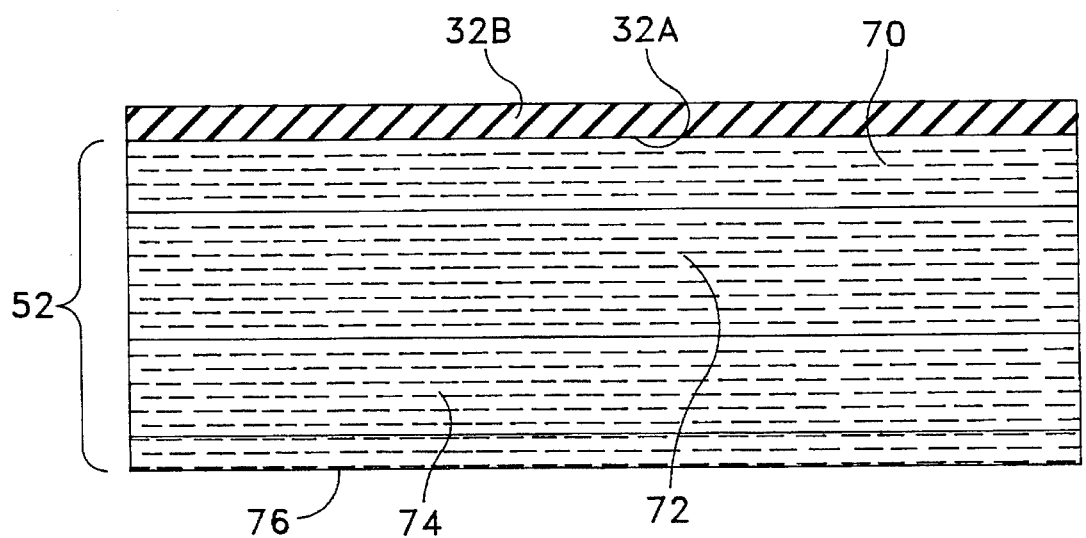
FIG. 6 is a diagrammatical illustration of electrically activated ER fluid in the device of FIG. 3.

Energizing the electrode disks 44 establishes two electric field regions within the flexible body 32, an electric field between each pair of opposing disks connected to wires 36A, 36B and an electric field in the fringe region 52. The fringe electrical field activates ER fluid 54 in fringe region 52. As illustrated in FIG. 6, the electric field potential in the fringe region 52 varies as a function of distance from the disk. A plurality of ER fluid layers 70, 72, 74, 76 are established in the fringe region 52. It should be noted that these ER fluid layers (70, 72, 74, 76) are idealized to represent the phenomenon. Each fluid layer has a characteristic and different strain rate, or shear stress, which decreases as the distance from the disk increases. The layer closest to the wall 32B of the flexible cylinder is in intimate contact with the inside surface 32A and does not slip with respect to the surface 32A when the wall moves. However, layer 70 can move, or slip, with respect to layer 72 when a sufficient force has been generated to overcome the frictional resistance at the plane between the two layers 70, 72. Similarly, the other layers (74, 76) can move, or slip, with respect to another layer (72, 74) when the force generated overcomes the frictional resistance at the plane between the two layers (layers 72, 74; layers 74, 76). Since the shear force increases closer to the disk, the amount of force required to overcome the frictional resistance at the plane between layers also increases closer to the disk. The vibratory energy used to overcome the resistance at the planes between the layers dampens the motion of the flexible cylinder (FIG. 7).

Since the electric field can be changed by increasing or decreasing the voltage applied to the electrode disks, the shear stress for each layer can be correspondingly changed, either upward or downward. In this manner, an operator can tune a damper for a given application.

The ER fluid damper of the present invention dissipates vibratory energy by means of the fringe electrical field established by the electrode disks. A single damper can be tuned so that it is optimally configured for a specific application without changing the design or construction of the damper and without changing parts or ER fluid. The ER fluid damper is of simple construction and does not involve the sophisticated manufacturing and machining required for prior art devices. The device is not dependent upon the viscosity of the fluid for its damping characteristic, nor on use of moving parts.

It is to be understood that the present invention is by no means limited to the particular construction herein disclosed and/or shown in the drawings, but also comprises any modifications or equivalents within the scope of the claims.

What is claimed is:

1. A vibration damping device comprising:

a flexible elongated body forming in part an enclosed chamber;

said elongated body having first and second ends sealed by rigid first and second end members, respectively, to form said enclosed chamber, an inside surface of said flexible body extending between said first and second end members;

a plurality of electrically conductive disks located within said chamber and spaced from each other along a common axis, the common axis being parallel to said inside surface of said flexible body;

a fluid filling said chamber and in contact with said flexible body inside surface and exposed surfaces of said conductive disks, said fluid being resistant to shear stress when said fluid is activated by an electric potential;

said electrically conductive disks being arranged in said flexible body so as to provide an open region bounded at least in part by said conductive disks and extending through said flexible body;

a rod of non-conductive material extending between said first and second end, said disks being mounted around said rod and spaced from said inside surface to form said open region;

a block disposed in said body proximate, but spaced from, said second end member;

said rod being a first end thereof fixed to said first end member, and at a second end thereof fixed to said block, said block being configured to center said rod second end in said flexible body; and means for electrically energizing said conductive disks to create an electric field between pairs of said conductive disks and to create an electric field in said open region, thereby activating said fluid in said open region and between each pair of said conductive disks, to render said fluid resistant to shear stress.

2. The device in accordance with claim 1 wherein said fluid comprises an electrorheological fluid.

3. The device in accordance with claim 1 wherein said flexible body is of substantially cylindrical configuration.

4. The device in accordance with claim 1 wherein said block is spaced from said second end member by a distance exceeding the axial deflection of said flexible body in operation.

5. The device in accordance with claim 1 wherein said disks are fixed on bushings disposed on said rod.

* * * * *